(12) United States Patent
Beal et al.

(10) Patent No.: US 7,997,220 B1
(45) Date of Patent: Aug. 16, 2011

(54) MARINE VESSEL MODULE

(76) Inventors: Robert Wayne Beal, Tualatin, OR (US);
Ronald William Bosch, Fairview, OR (US); Roy Joseph Firestone, Clackamas, OR (US)

(*) Notice: Subject to any disclaimer, the term of this patent is extended or adjusted under 35 U.S.C. 154(b) by 0 days.

(21) Appl. No.: 10/856,919

(22) Filed: May 28, 2004

(51) Int. Cl.
*B63B 3/00* (2006.01)
(52) U.S. Cl. ..................................... 114/65 R
(58) Field of Classification Search .............. 114/72, 114/77 R, 1, 15, 65 R; 89/1.801
See application file for complete search history.

(56) References Cited

U.S. PATENT DOCUMENTS

| | | | | |
|---|---|---|---|---|
| 4,031,838 A | * | 6/1977 | Schmidt et al. | 114/1 |
| 4,476,798 A | * | 10/1984 | Backus | 114/77 R |
| 4,553,493 A | * | 11/1985 | Sadler et al. | 114/1 |
| 4,579,073 A | * | 4/1986 | Sadler et al. | 114/1 |
| 4,678,439 A | * | 7/1987 | Schlichthorst | 440/11 |
| 4,884,929 A | * | 12/1989 | Smith et al. | 411/3 |

* cited by examiner

*Primary Examiner* — Stephen Avila
(74) *Attorney, Agent, or Firm* — Ingrid McTaggart

(57) ABSTRACT

One embodiment of a module for a marine vessel includes a base that has a cavity for securing a variety of cargos therein, and a top plate that defines a perimeter and a top surface, the perimeter adapted to define a water-tight seal with a hull of a marine vessel and the top surface defining a smooth plane having a substantial absence of steps and gaps therein.

33 Claims, 6 Drawing Sheets

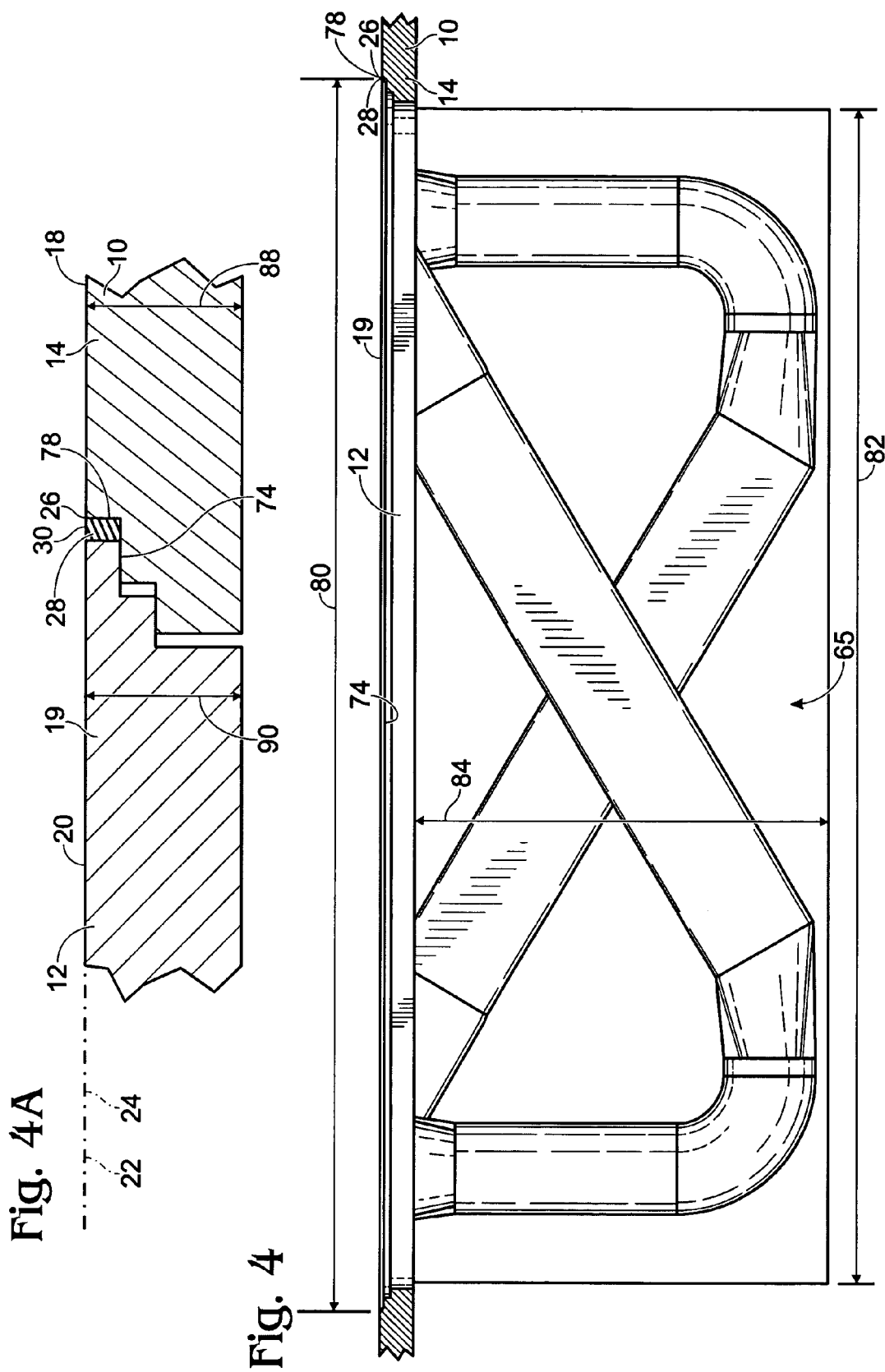

MARINE VESSEL MODULE

BACKGROUND

Marine vessel hulls may include a cargo area for receiving a variety of sized cargo therein. An open cargo area may be exposed on an exterior surface of the marine vessel such that the vessel may not be water tight and may be susceptible to radar detection. A closed cargo area may not allow deployment of items from the cargo area during transport of the cargo.

BRIEF DESCRIPTION OF THE DRAWINGS

FIG. 4 is a side, partial cross-sectional view of one embodiment of a module secured within a hull of a marine vessel.

FIG. 4A is a detailed partial cross-sectional view of a module secured directly to a hull.

FIG. 11 is a side view of one embodiment of a module including a vessel mounted artillery system.

DETAILED DESCRIPTION OF THE DRAWINGS

Figure 1:
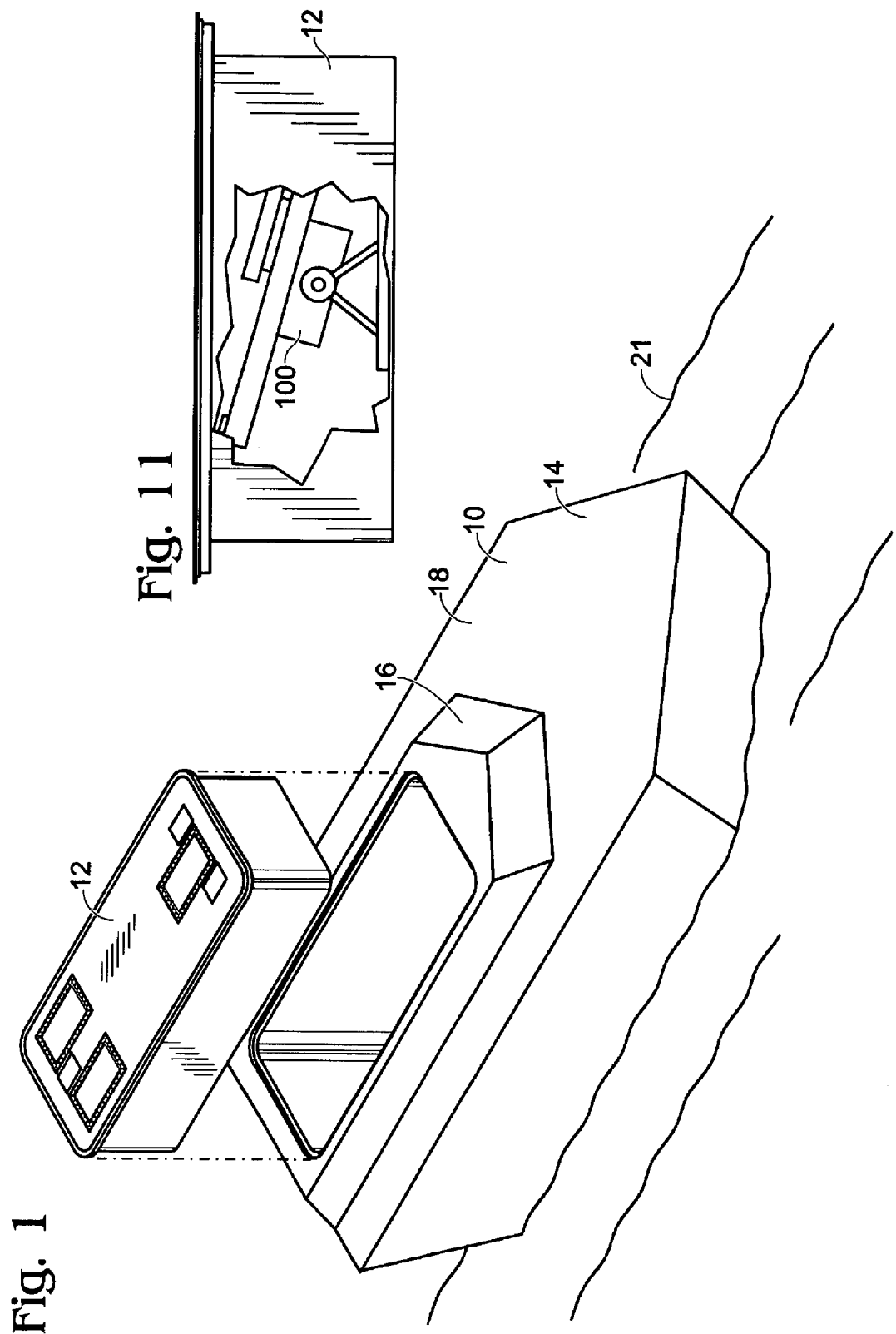
FIG. 1 is a perspective, exploded view of one embodiment of a marine vessel including one embodiment of a module.

FIG. 1 is a perspective exploded view of one embodiment of a marine vessel 10 including one embodiment of a module 12 for holding cargo therein. Vessel 10 may comprise any vessel adapted for use on or in water, such as a boat, a submarine, or a plane adapted for landing on water. In the embodiment shown, vessel 10 may comprise a boat including a hull 14, wherein hull 14 may comprise a portion of vessel 10 that may come into contact with a body of water through which vessel 10 moves. Vessel 10 may further include a control area 16 for crew members or control components. Hull 14 may include an exterior surface 18 that may be generally streamlined and/or have a smooth surface so as to cut through the water and/or air during movement of vessel 10 therethrough. Module 12 may be positioned anywhere within hull 14 but generally may be positioned in a region of hull 14 that may come into contact with water 21 surrounding hull 14. Accordingly, it may be desirable that module 12 and hull 14 define a water-tight seal therebetween.

Figure 2:
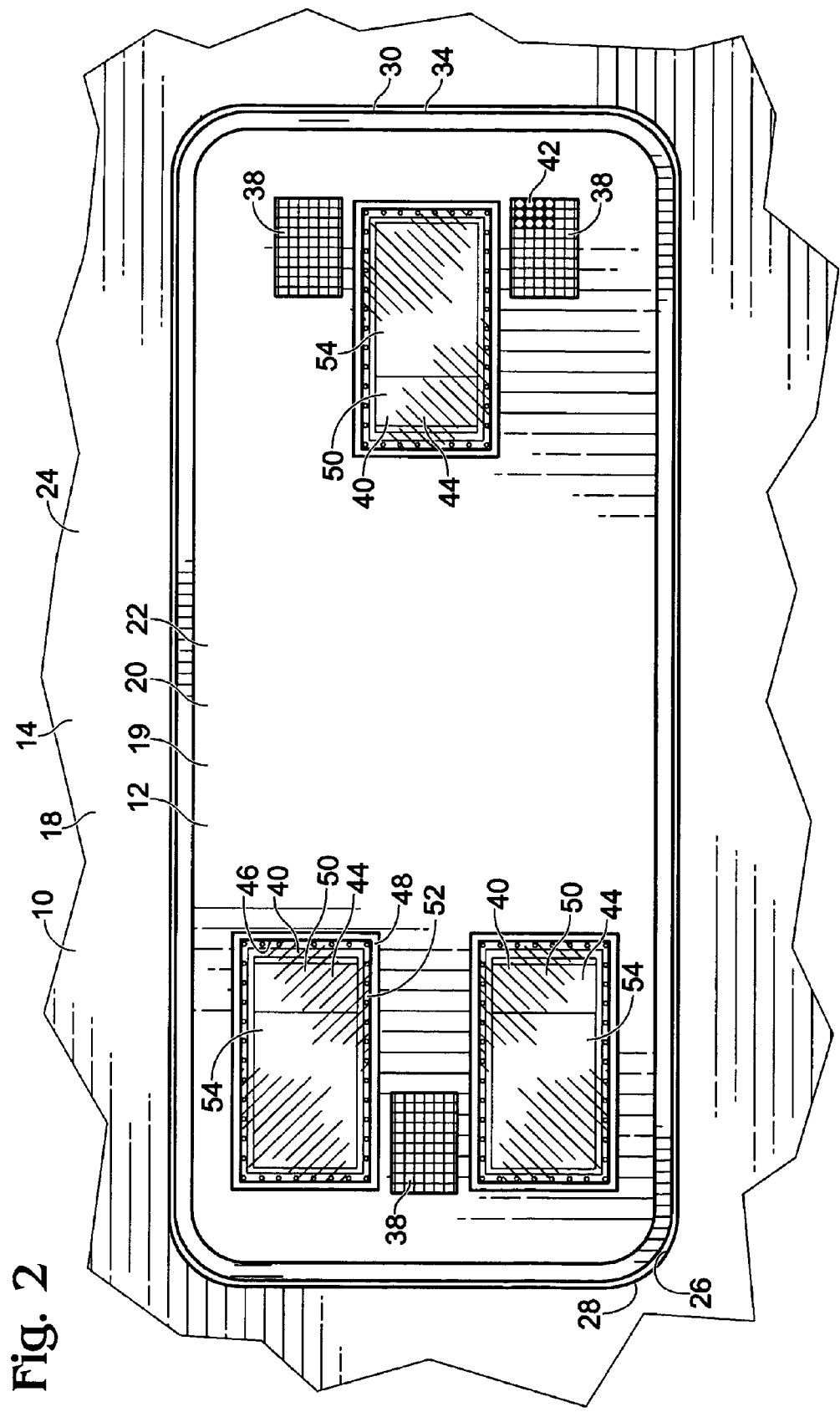
FIG. 2 is a top view of one embodiment of a module installed in a marine vessel.

FIG. 2 is a top view of one embodiment of module 12 secured to hull 14, wherein a top plate 19 of module 12 has a generally rectangular shape. In the embodiment shown, top plate 19 of module 12 may include a top surface 20 that may define a plane 22. Exterior surface 18 of hull 14 may also define a plane 24, and in the embodiment shown, plane 24 of hull 14 may be contiguous with plane 22 of top plate 19 of module 12. In other words, in the embodiment shown, plane 22 and plane 24 may define substantially the same plane. By "substantially the same plane" applicants mean that the structural components recited each define a plane within 0.1 inch, or less, of one another. In other words, there may be a vertical step of 0.1 inch or less between the two planes.

Hull 14 may include an aperture 26 having a shape, such as a generally rectangular shape as shown, wherein top plate 19 of module 12 may have a substantially similar shape, and may be secured within aperture 26, such as by a weld 28. Weld 28 may define a top surface 30 that may be positioned substantially in plane 22 and in plane 24. Weld 28 may fill a gap 32 between hull 14 and top plate 19 of module 12 and may be sanded or otherwise smoothed after welding so that the top surface 30 of weld 28 may define a substantially smooth outer surface in planes 22 and 24. Due to the positioning of top surface 20 of module 12, top surface 30 of weld 28 and exterior surface 18 of hull 14 substantially in the same plane, vessel 10 may have reduced susceptibility to radar detection. Moreover, due to weld 28, which may extend completely around a perimeter 34 of top plate 19 of module 12, weld 28 may define a water tight seal between module 12 and hull 14. Due to the shape of top surface 20 of module 12 and the substantially matching shape of aperture 26 in exterior surface 18 of hull 14, there may be no appreciably visible gap between module 12 and hull 14. Accordingly, hull 14, weld 28, and module 12 may define a substantially smooth, continuous exterior surface of marine vessel 10 having no substantial steps (vertical discontinuities) and no substantial gaps (horizontal discontinuities) such that marine vessel 10 may be substantially undetectable by radar systems.

Still referring to FIG. 2, top plate 19 of module 12 may include, for example, three air vents 38, such as an exhaust vent 38, and three exit ports 40, such as a missile launch opening 40. Air vents 38 may comprise a plurality of small apertures 42 each having a diameter of, for example, 0.1 inch or less, wherein the apertures extend through top surface 20. Accordingly, air vent 38 may comprise hundreds of apertures 42 such that air or another fluid, such as water, may move through apertures 42 and thereby through top plate 19 of module 12. Exit ports 40 may each comprise a cover 44, also referred to as a closure structure, such as a transparent, glass cover, that may be secured within a recess 46 by fasteners 48. Recess 46 may position a top surface 50 of cover 44 within plane 22 and may define a water tight seal between recess 46 and cover 44. Moreover, a top surface 52 of fasteners 48 may be recessed within cover 44 such that top surface 52 of fasteners 48 is also positioned within plane 22. Recess 46 may also define an electrical contact between. Accordingly, an outer surface of air vents 38 and exit ports 40 may be positioned within plane 22 such that module 12, and marine vessel 10, may be substantially undetectable by radar systems.

Cover 44 may be manufactured of a material that may withstand the environmental conditions required for maintaining the structural integrity and the water tight seal of hull 14 during normal transport operations of vessel 10. However, cover 44 may be manufactured of a material, such as glass, that may be susceptible to fracture when a cargo is deployed through exit port 40, such as when a missile (see FIG. 3) is fired therefrom. Moreover, due to the positioning of exit port 40 on an exterior surface of hull 14, a missile (see FIG. 3) stored within module 12 may be readily accessible for deployment from vessel 10 during movement of the vessel through water. In the embodiment shown, module 12 may contain three missile ports 54, also called missile launchers, each missile port including an exit port 40 and an exhaust air vent 38. In other embodiments, other numbers of missile ports 54, may utilized within module 12, such as one, two, four or more missile ports. In such other embodiments it may be desirable that perimeter 34 of top plate 19 of another module 12 be manufactured in the same shape and size as the module shown such that any module may be welded or otherwise secured within aperture 26 of hull 14 regardless of the cargo held within the module. In this manner, module 12 may hold any cargo as may be desired, yet may easily be secured within hull 14 due to the predetermined outer shape of module 12. For example, in other embodiments, module 12 may hold different kinds of cargo from the missiles and missile ports shown, such as holding a periscope, a satellite deployment system, a communication system, a vessel mounted artillery system, or the like. Vessel 10 may be easily fitted for a variety of operational tasks, therefore, by securing within aperture 26 one of several modules 12, each module having the same external size and shape, but each module having a variety of different cargo secured therein. In this manner, hull 14 of vessel 10 may be manufactured in a single predetermined size and shape. Moreover, weld 34 may be broken or otherwise removed after use of a module 12, such that a second module 12, having a different cargo secured, may be secured within hull 14. Marine vessel 10, therefore, may be utilized for a variety of missions without requiring re-manufacturing or otherwise modifying hull 14.\

Hull 14, weld 28, and top plate 19 may each be manufactured of an electrically conductive material such as aluminum. Cover 44 may be manufactured of an electrically conductive material such as electrically conductive glass. Cover 44 may be in electrically conductive contact with top plate 19 at recess 46 such that hull 14, top plate 19, and cover 44 define a substantially continuous electrically conductive surface such that module 12 and vessel 10 may be substantially undetectable by radar systems.

Figure 3:
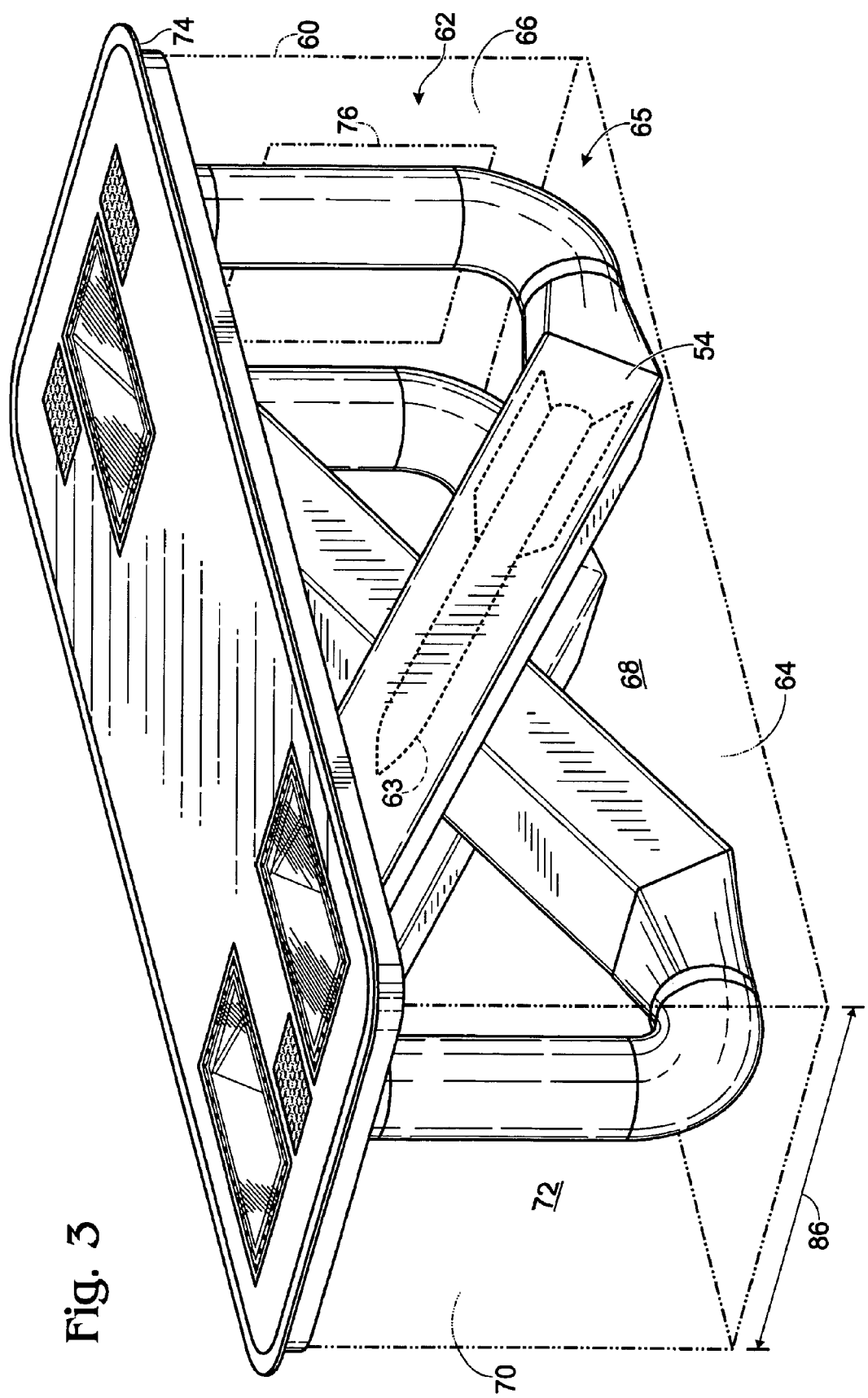
FIG. 3 is a perspective view of one embodiment of a module wherein an outer casing of the module is shown as transparent so that interior cargo may be viewed.

FIG. 3 is a perspective view of one embodiment of module 12 wherein an outer casing 60 of module 12 is shown as transparent so that an interior cargo 62, such as a missile 63 (shown in dash lines) contained within a missile port 54, may be viewed. Outer casing 60 may also be referred to as a tub or a base, and may include a bottom surface 64 and four upwardly extending side walls 66, 68, 70 and 72, that may define a cavity 65 and may each be secured to a lower surface 74 of top plate 19. In one embodiment, one of the side walls, such as side wall 66, may include an access door 76 such that interior cargo 62 may be accessed from within an interior of hull 14 of vessel 10.

FIGS. 4 and 4A are a side, partial cross-sectional view, and a detail thereof, respectively, of one embodiment of module 12 secured directly to hull 14 of a marine vessel 10. In particular, top plate 19 may be secured to hull 14 by weld 28. Aperture 26 of hull 14 may include a recess 78 that may support lower surface 74 of top plate 19 so as to position top surface 20 of plate 19 in plane 24 of exterior surface 18 of hull 14. In the embodiment shown, top plate 19 may have a length 80 of approximately eight feet, outer casing 60 may have a length 82 of approximately seven feet ten inches, a height 84 of approximately four feet, and a width 86 (see FIG. 3) of approximately four feet. Hull 14 and top plate 19 may each include in their edge regions a thickness 88 and 90, respectively, that may have substantially the same dimension, such as approximately one inch. Accordingly, other modules 12 may include substantially similar outer dimensions such that such other modules may easily be secured within aperture 26 of hull 14. Of course, those skilled in the art will understand that module 12 may be manufactured in any size and/or shape, that may correspond to the size and or shape of aperture 26 of hull 14, so that module 12 may be secured within hull 14 by a securement method, such as by welding.

Figure 4B:
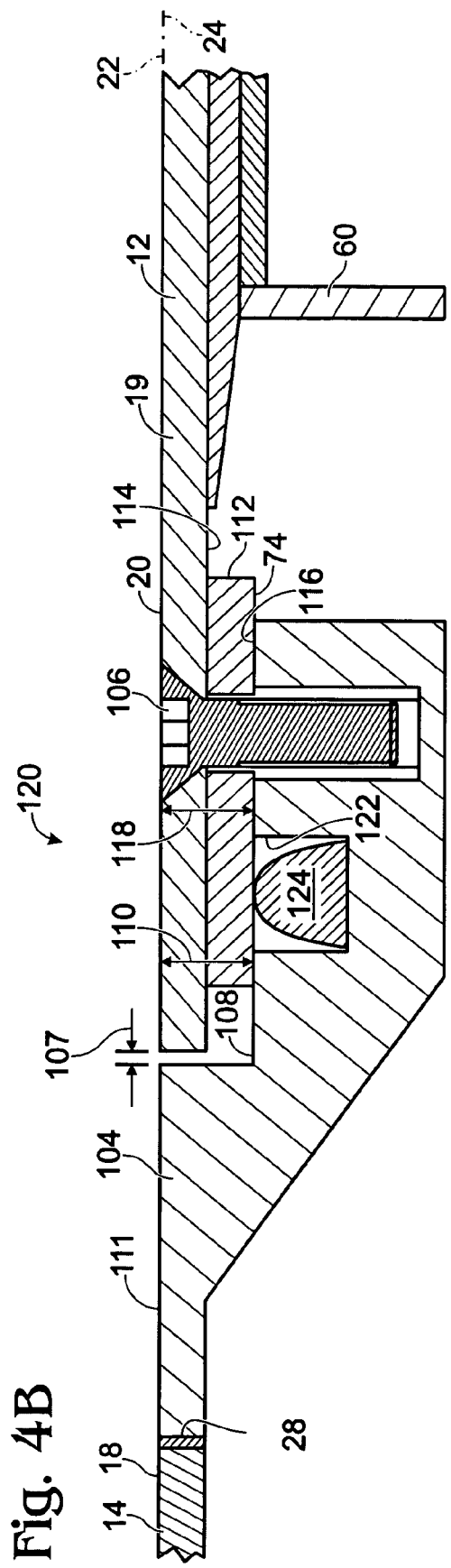
FIG. 4B is a detailed partial cross-sectional view of a module secured to a coaming structure that is secured to a hull.

FIG. 4B is a detailed partial cross-sectional view of a module 12 secured to a coaming structure 104, also referred to as a structural interface, that may be secured to a hull 14, such as by a weld 28. Coaming structure 104 may be machined from a single block of material, such as electrically conductive aluminum, such that the coaming structure may be manufactured to meet particular specifications while substantially reducing the occurrence of stresses created within the material. Top plate 19 of module 12 may be secured to coaming structure 104 by a fastener 106, such as a threaded screw 106 that may extend through top plate 19 and into coaming structure 104. Top plate 19 and coaming structure 104 may each include a threaded recess adapted for receiving fastener 106 such that fastener 106 may align top plate 19 and coaming structure 104 with a gap 107 therebetween. Gap 107 may be of a relatively small size, such as 0.1 inch or less, such that module 12 and vessel 10 may be substantially undetectable by radar systems.

Coaming structure 104 may include a recess 108 having a depth 110 adapted to receive top plate 19 of module 12 such that top surface 20 of plate 19 and top surface 111 of coaming structure 104 may be substantially positioned in planes 22 and 24, i.e., positioned with 0.1 inch or less of each other, such that module 12 and vessel 10 may be substantially undetectable by radar systems. In particular, top plate 19 may include a positioning plate 112, such as a seat bar 112, secured to an underside 114 of top plate 19 so as to define lower surface 74 of top plate 19. Lower surface 74 of top plate 19 may be received on an upper surface 116 of recess 108 of coaming structure 104. Seat bar 112 may be machined so as to precisely control the thickness 118 of top plate 19 in edge region 120 so as to position top surface 20 of plate 19 in planes 22 and 24 when top plate 19 is secured within coaming structure 104.

Coaming structure 104 may further include a recess 122 having a seal 124 positioned therein. Seal 124 may extend upwardly and out of recess 122 in a non-compressed state. The seal may be compressed by lower surface 74 of top plate 19 when module 12 is secured on coaming structure 104 so as to define a water-tight seal between top plate 19 and coaming structure 104.

Coaming structure 104, weld 28, hull 14 and top plate 19 of module 12 may each be manufactured of an electrically conductive material, such as aluminum, such that coaming structure 104, weld 28, hull 14 and top plate 19 of module 12 may define a substantially continuous electrical conductivity path across said vessel 10 such that vessel 10 having module 12 secured therein is substantially undetectable by radar systems.

Figure 5:
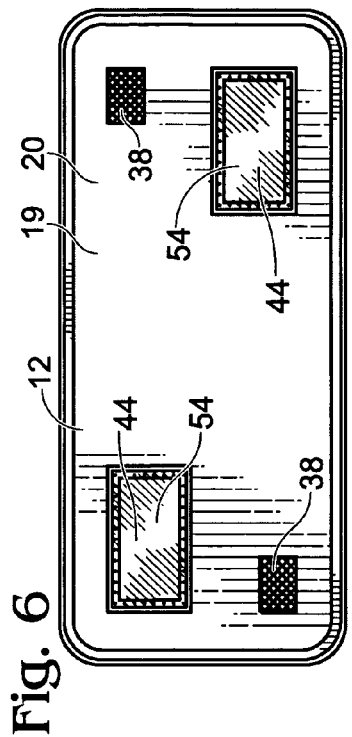
FIG. 5 is a top view of one embodiment of a module including one missile launcher.

FIG. 5 is a top view of one embodiment of a module 12 including one missile launcher 54.

Figure 6:
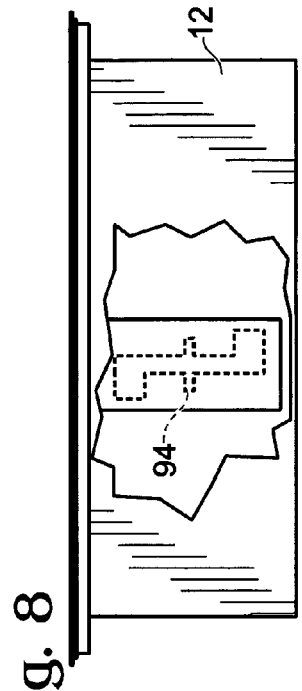
FIG. 6 is a top view of one embodiment of a module including two missile launchers.

FIG. 6 is a top view of one embodiment of a module 12 including two missile launchers 54.

Figure 7:
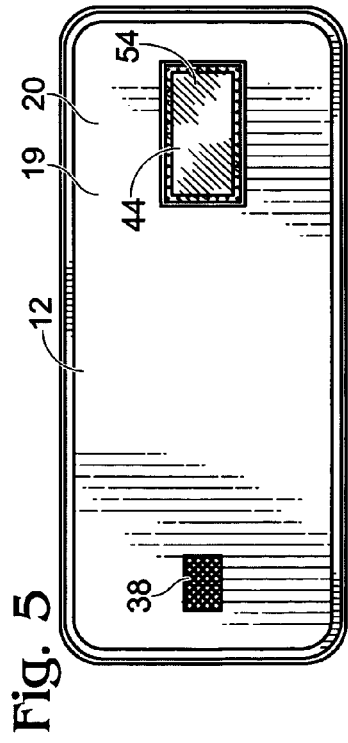
FIG. 7 is a top view of one embodiment of a module including four missile launchers.

FIG. 7 is a top view of one embodiment of a module 12 including four missile launchers 54.

Figure 8:
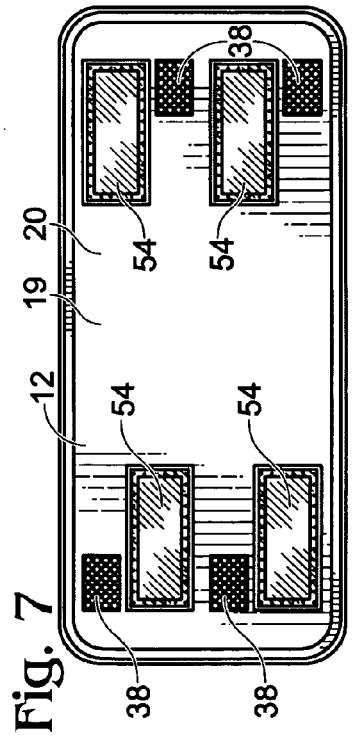
FIG. 8 is a side view of one embodiment of a module including a periscope.

FIG. 8 is a side view of one embodiment of a module 12 including a periscope 94 (shown in dash lines), wherein casing 60 is shown as transparent.

Figure 9:
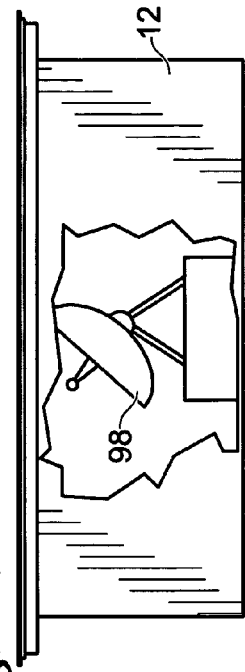
FIG. 9 is a side view of one embodiment of a module including a satellite deployment system.

FIG. 9 is a side view of one embodiment of a module including a satellite deployment system 96 (shown in dash lines), wherein casing 60 is shown as transparent.

Figure 10:
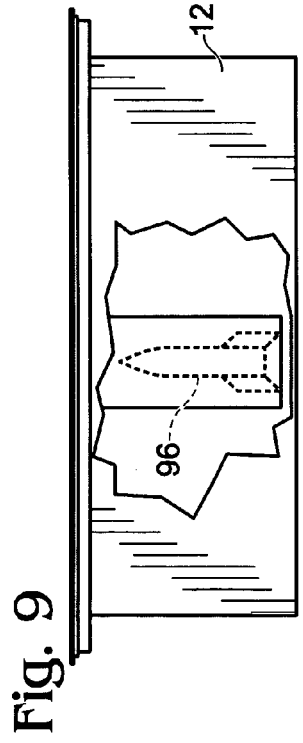
FIG. 10 is a side view of one embodiment of a module including a communication system.

FIG. 10 is a side view of one embodiment of a module including a communication system 98, wherein casing 60 is shown as transparent.

FIG. 11 is a side view of one embodiment of a module including a vessel mounted artillery system 100, wherein casing 60 is shown as transparent.

Other variations and modifications of the concepts described herein may be utilized and fall within the scope of the claims below.

We claim:

1. A module for a marine vessel, comprising:
    a tub that includes a cavity for securing a cargo therein;
    a top plate that is secured to said tub and that defines a perimeter and a top surface, said perimeter adapted to define a water-tight seal with a hull of a marine vessel and said top surface defining a smooth plane having a substantial absence of steps and gaps therein; and
    attachment structure for securing said top plate into an aperture of a marine vessel hull such that said top surface of said top plate and a top surface of said attachment structure are both positioned in a plane of an exterior surface of said hull,
    wherein said tub is structurally separate from a marine vessel in which said tub is installed and is secured to a marine vessel in which said tub is installed only by said top plate.

2. A module according to claim 1 wherein said hull includes an aperture of a predetermined size positioned therein, and wherein said top plate perimeter is sized to be received within said aperture to define said water-tight seal between said aperture and said perimeter.

3. A module according to claim 1 wherein said smooth plane of said top surface is contiguous with a plane of an exterior surface of said hull.

4. A module according to claim 1 wherein said top surface has an absence of steps greater than 0.1 inches and an absence of gaps greater than 0.1 inches.

5. A module according to claim 1 wherein said cargo is chosen from one of a missile launcher, a periscope, a satellite deployment system, a communication system, and a vessel mounted artillery system.

6. A module according to claim 5 wherein said missile launcher comprises a number of missile tubes chosen from one missile tube, two missile tubes, three missile tubes, and four missile tubes.

7. A module according to claim 1 wherein said top plate includes an air vent and an output aperture therein, said air vent comprising a plurality of holes and said output aperture including a cover, said cover defining an exterior surface positioned in said smooth plane of said top plate.

8. A module according to claim 7 wherein said cover is manufactured of electrically conductive glass.

9. A module according to claim 1 wherein said tub includes an access door therein so as to access said cavity.

10. A module according to claim 1 wherein said top plate defines a substantially rectangular shape.

11. A module according to claim 1 wherein said top plate is manufactured of a conductive material and defines a continuous electrical conductivity path there across.

12. A module according to claim 1 wherein said module is substantially undetectable by radar when secured to a hull.

13. A marine vessel, comprising:
    a hull including an aperture therein and an exterior surface that defines a plane; and
    a module secured within said aperture of said hull by attachment structure, said module including a top plate that defines a plane contiguous with said plane of said hull, wherein said module is adapted for receiving a variety of cargos therein, said module including a bottom surface and a side surface such that a cargo held within said module is separated from contact with said hull by said bottom surface and said side surface and wherein said module is secured to said hull only by said top plate,
    wherein said top plate of said module, a top surface of said attachment structure, and said exterior surface of said hull together define a marine vessel outer surface having an absence of horizontal discontinuities and which is substantially undetectable by radar.

14. A marine vessel according to claim 13 wherein said top plate of said module includes an aperture therein and a closure structure positioned within said aperture, said closure structure including an exterior surface that defines a plane contiguous with said plane of said hull.

15. A marine vessel according to claim 13 wherein said top plate is welded to said hull, and wherein said weld includes a top surface positioned in said plane of said hull such that said hull, said weld and said top plate define a substantially smooth exterior surface.

16. A marine vessel according to claim 13 wherein said hull has a thickness, wherein said top plate is secured to said hull in an edge region, and wherein said edge region of said top plate has a thickness substantially similar to said thickness of said hull.

17. A marine vessel according to claim 13 wherein said module defines a cavity sized to receive said variety of cargos therein.

18. A marine vessel according to claim 13 wherein said module is releasably secured within said aperture.

19. A marine vessel according to claim 13 wherein said hull and said top plate of said module are both manufactured of an electrically conductive material, and wherein said top plate is secured to said hull so as to define a continuous electrical conductivity path from said hull and through said top plate.

20. A marine vessel according to claim 19 wherein said top plate and said hull are both manufactured of aluminum.

21. A method of sealing an aperture in a marine vessel hull, comprising:
    providing a hull including an aperture therein, said hull defining an exterior surface; and
    securing a cover plate of a module to said hull and within said aperture such that an exterior surface of said cover plate is aligned in a single plane with said exterior surface of said hull, said module defining a walled enclosure adapted to receive a variety of cargos therein such that a cargo received within said module is structurally disconnected from said marine vessel hull,
    wherein said hull and said module are each manufactured of a conductive material, and wherein said module provides a continuous electrical conductivity path from said hull and across said module continuously and without interruption along an entire perimeter of said module, and
    wherein said module is secured to said hull only at said cover plate.

22. A method according to claim 21 wherein said cover plate is welded to said hull within said aperture.

23. A method according to claim 21 wherein said walled enclosure defines an interior for receiving said variety of cargos therein.

24. A marine vessel, comprising:
    a hull including an aperture; and
    means for containing a variety of loads therein, said means for containing defining a bottom surface, a side surface, and a top surface having a predetermined perimeter that substantially matches said aperture, said means for containing secured within said aperture such that said top surface is positioned in a plane with a top surface of said hull, wherein said means for containing provides a continuous electrical conductivity path through said hull and across said top surface of said means for containing along an entire length of said perimeter of said means for containing, wherein a load contained within said means for containing is out of direct contact with said hull wherein said means for containing is secured to said hull only at said top surface.

25. A marine vessel according to claim 24 wherein said means for containing comprises a tub including said top surface, said tub defining an interior cavity adapted for containing said variety of loads therein.

26. A marine vessel according to claim 24 wherein said means for containing secures at least one missile launcher therein.

27. A marine vessel according to claim 24 wherein said module is secured to said hull so as to define a water-tight seal there between.

28. A marine vessel comprising:
a marine vessel hull including an outer surface having an aperture therein and defining a plane, and an interior cavity having a predetermined size so as to receive one of a plurality of modules therein; and
a module positioned within said interior cavity and secured to said hull only by a module cover positioned within said aperture, said cover having an outer surface that includes an air vent comprising a plurality of coverless openings that are substantially undetectable by radar and wherein said cover of said module is secured by attachment structure within said aperture and in said plane such that said outer surface of said cover, an outer surface of said attachment structure, and said outer surface of said hull define a connection region having an absence of horizontal discontinuities, and wherein said module includes a casing that physically separates an interior of said module from said marine vessel hull.

29. A marine vessel according to claim 28 wherein said module includes an exterior that substantially matches said predetermined size, and is adapted to receive a variety of cargos therein wherein said casing physically separates said cargo from contact with said marine vessel hull.

30. A marine vessel according to claim 29 wherein said module and said hull define a substantially continuous electrical conductivity path there through.

31. A marine vessel according to claim 28 wherein said marine vessel is chosen from one of a boat, a submarine, and a plane adapted for landing on water.

32. A marine vessel according to claim 13 wherein said top plate is secured to a coaming structure that is secured to said hull by a weld, and wherein said weld and said coaming structure each include a top surface positioned substantially in said plane of said hull such that said hull, said weld, said coaming structure and said top plate define a substantially smooth exterior surface.

33. A marine vessel according to claim 24, further comprising:
a structural interface fixedly secured within said aperture of said hull, and said means for containing releasably secured within said structural interface.

* * * * *